United States Patent [19]

Hecht et al.

[11] Patent Number: 5,153,556
[45] Date of Patent: Oct. 6, 1992

[54] TEMPERATURE SENSOR

[75] Inventors: Hans Hecht, Korntal; Dietrich Bergfried, Boeblingen; Richard Muehlheim, Tuebingen; Botho Ziegenbein, Reutlingen; Guenther Stecher, Ludwigsburg, all of Fed. Rep. of Germany

[73] Assignee: Robert Bosch GmbH, Stuttgart, Fed. Rep. of Germany

[21] Appl. No.: 395,350

[22] Filed: Aug. 17, 1989

[30] Foreign Application Priority Data

Aug. 29, 1988 [DE] Fed. Rep. of Germany ....... 3829195

[51] Int. Cl.$^5$ .............................................. H01C 3/04
[52] U.S. Cl. ...................................... 330/25; 374/185
[58] Field of Search .................. 338/25; 374/183, 185, 374/208, 209; 73/154

[56] References Cited

U.S. PATENT DOCUMENTS

| 4,219,399 | 8/1980 | Gruner et al. . |
| 4,288,775 | 9/1981 | Bennewitz et al. ............... 338/25 X |
| 4,345,465 | 8/1982 | Gruner et al. . |
| 4,358,748 | 11/1982 | Gruner et al. . |
| 4,382,247 | 8/1980 | Stecher et al. . |
| 4,418,329 | 11/1983 | Gruner . |
| 4,498,337 | 2/1985 | Gruner . |
| 4,596,762 | 6/1986 | Gruner . |
| 4,777,820 | 10/1988 | Hecht et al. . |
| 4,816,200 | 3/1989 | Stecher et al. . |

Primary Examiner—Marvin M. Lateef
Attorney, Agent, or Firm—Frishauf, Holtz, Goodman & Woodward

[57] ABSTRACT

A fast-responding temperature sensor, for measuring temperature of a medium, features a resistance element (12) formed as a film on an insulating substrate (10). The resistance element is disposed in a bubble or dome (11) of ceramic, preferably glass ceramic, which is formed on, and bowed with respect to, the insulating substrate (10).

5 Claims, 1 Drawing Sheet

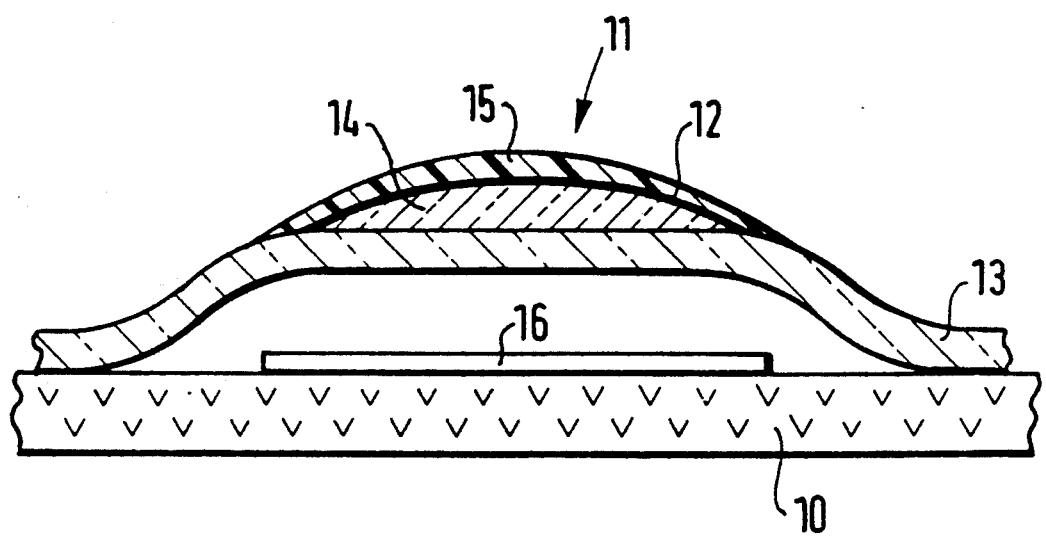

TEMPERATURE SENSOR

Cross-reference to related U.S. patents assigned to Robert Bosch GmbH, the disclosures of which are hereby incorporated by reference: U.S. Pat. Nos. 4,219,369; 4,345,465; 4,358,748; 4,382,247; 4,418,329; 4,498,337; 4,596,762; 4,777,820.

Cross-reference to related patent document: Heiko GRUNER, German published unexamined application DE-OS 31 27 727.

Cross-reference to related literature: *Handbook of Thick Film Hybrid Microelectronics*, chapters 5–7, edited by Charles Harper, McGraw-Hill, New York, 1974.

The present invention relates generally to thin-film temperature sensors and, more particularly, to an improved, fast-responding sensor formed on a glass ceramic bubble.

BACKGROUND

German application DE-OS 31 27 727, GRUNER, discloses a temperature sensor having a thin-film resistance element 21 formed as a layer on the flat upper surface of an insulating substrate 2. Such a structure in a temperature sensor means a strong thermal coupling of the resistance element to the insulating substrate. For stability reasons, there is a minimum thickness of the insulating substrate, which results in a large heat-absorption capacity in the temperature sensor. Thus, fast response and fast temperature measurements are not possible with this conventional temperature sensor structure.

U.S. Pat. No. 4,382,247, STECHER et al./BOSCH, discloses a pressure measurement cell having a pressure-sensitive membrane in the form of a glass ceramic bubble, applied by thick-film technology to an insulating substrate.

THE INVENTION

Thus, it is an object of the present invention to improve the response time of thin-film sensors by thermally decoupling the sensing layer from the temperature of the substrate and increasing thermal coupling between the sensor and the medium whose temperature is to be sensed.

Briefly, this is accomplished by forming the sensing layer on a dome which is, in turn, formed on the substrate. The substrate provides mechanical stability, while the dome serves to thermally separate the resistance or sensing layer from the relatively large heat-absorption capacity of the substrate, thereby speeding up response of the sensing layer to changes in ambient temperature resulting from contact with the medium to be measured.

Preferably, the dome is produced on the substrate by a sequence of thick-film paste application and firing steps, and the resistance layer is applied thereto as a thin film.

DRAWING

The single FIGURE is a cross-section of the improved temperature sensor of the present invention.

DETAILED DESCRIPTION

The temperature sensor comprises a ceramic substrate 10 over which is formed a curved bubble or dome 11 of a ceramic material, preferably a glass ceramic. The sensor is designed to measure the temperature of an external medium, such as a gas or liquid streaming past. Within dome 11, a resistance element 12, formed as a resistance layer, is provided. Dome 11 contains a membrane 13 formed in thick-film technology and strengthened by infiltration of glass. Resistance element 12 is disposed on membrane 13. Between membrane 13 and resistance element 12, an intermediate layer 14 of glass is preferably provided. Resistance element 12 is covered by a highly-heat-conductive protective layer 15, preferably of glass. Preferably a glaze of 0.01 mm of No. 4011C sealing glass, available commercially from Electro-Science Laboratories Inc. of Pennsauken, N.J. 08110, is used.

METHOD OF MAKING THE TEMPERATURE SENSOR

The process begins by depositing on substrate 10, at the position where dome 11 is to be formed, a foundation or landing 16 of thick film paste. The paste is first printed, then dried and burned in air. Onto foundation 16, a layer of carbon paste or filler (not shown) is printed, then dried and burned in nitrogen. As described in STECHER U.S. Pat. No. 4,382,247, the filler preferably includes a primary constituent of carbon black and a polyester resin of isophthalic acid, solved in terpineol and styrol and additives. Carbon, resin, solvents, and additives are mixed to proportions by weight of about 10/40/40/10. Upon burning of the carbon paste in nitrogen, essentially only the volatile components are driven off, leaving the carbon as a solid constituent.

Then a ceramic thick-film paste layer is applied to the carbon layer and to a surrounding border area. As described in U.S. Pat. No. 4,382,247, the paste is preferably a ceramic material consisting of a a $PbO/B_2O_3/SiO_2$-glass and $Al_2O_3$. A commercially available composition is dielectric 9949 from DuPont de Nemours, Inc. of Wilmington, Del. 19898 USA. The system is subsequently burned in nitrogen at about 950° C. and then in air at about 700° C.

Upon burning the system in air, oxygen passes through pores in the ceramic, the carbon layer completely burns up, and the layer on top of the carbon layer is bowed upward by the combustion products to form a membrane. At this stage of the process, the membrane is still too porous and too thin, so it is subsequently strengthened and made less porous by infiltration of glass. In this manner, membrane 13 as shown in the drawing is formed.

Now onto membrane 13, a glass layer 14 is printed, which serves as a foundation for the resistance element 12, formed as a layer, which is to be applied. Layer 14 improves the adhesion and homogeneity of the resistance element. However, glass layer 14 may or may not be necessary, depending upon the materials selected for membrane 13.

For manufacture of resistance element 12, a platinum paste is used. A number of commercially available platinum pastes are suitable. Subsequently, protective layer 15 is applied. Protective layer 15 protects the resistance element 12 and its associated conductive tracks (not shown) from dirt and corrosion. Protective layer 15 is so dimensioned that a good thermal coupling of the temperature of the medium to the temperature of the resistance element is assured.

The media whose temperature can be be measured include gases, liquids, and solid bodies.

METHOD OF USE

The structure thus made can be used for measuring temperature by connecting opposing ends of the resistance element 12 to respective terminals of a current source, measuring, for calibration purposes, a resistance value in the resistance element 12 at each of a series of different temperatures in a predetermined temperature range, contacting the resistance element with a medium whose temperature is to be measured, measuring the value of resistance of the resistance element 12 after the contacting step, and determining, from the measured resistance value, the temperature of the medium in contact with the resistance element.

Various changes and modifications are possible within the scope of the inventive concept. In particular, any feature set forth in one of the Bosch patents incorporated by reference may be combined with features from another of these patents.

We claim:

1. Temperature sensor, for measuring the temperature of a medium, having
   an insulating substrate (10); and
   a resistance element (12) formed as a resistance layer supported by said substrate;
   wherein,
   for faster temperature measurement, a dome or bubble (11) of ceramic material, particularly glass ceramic, is formed on said insulating substrate (10), and
   said resistance element (12) is formed on said bubble (11), thereby serving to thermally separate said resistance element from said substrate.

2. Temperature sensor according to claim 1, wherein
   said bubble contains a membrane (13) produced by thick film technology and reinforced by infiltration of glass; and
   said resistance element (12) is formed on said membrane (13).

3. Temperature sensor according to claim 2, wherein
   a highly-heat-conductive protective layer (15), preferably of glass, is applied as a covering on said resistance element.

4. Temperature sensor according to claim 2, wherein
   an intermediate layer (14), preferably of glass, is provided between said membrane (13) and said resistance element (12).

5. Temperature sensor according to claim 3, wherein
   an intermediate layer (14), preferably of glass, is provided between said membrane (13) and said resistance element (12).

* * * * *